United States Patent [19]

Kelly

[11] Patent Number: 5,091,665
[45] Date of Patent: Feb. 25, 1992

[54] LINEAR MOTORS

[76] Inventor: Hugh-Peter G. Kelly, 66 Westleigh Avenue, Leigh-On-Sea, Essex, United Kingdom

[21] Appl. No.: 577,570

[22] Filed: Sep. 5, 1990

[30] Foreign Application Priority Data

Sep. 5, 1989 [GB] United Kingdom ............... 8920013

[51] Int. Cl.$^5$ ........................................... H02K 41/00
[52] U.S. Cl. ........................................ 310/12; 310/13; 318/135
[58] Field of Search ................... 310/12, 13, 14; 318/135

[56] References Cited

U.S. PATENT DOCUMENTS

| 4,661,730 | 4/1987 | Maruyama et al. | 318/135 |
| 4,868,431 | 9/1990 | Karita et al. | 310/12 |
| 4,965,864 | 10/1990 | Roth et al. | 310/12 |

FOREIGN PATENT DOCUMENTS

| 0063614 | 11/1982 | European Pat. Off. | 318/66 |
| 0224377 | 6/1987 | European Pat. Off. | 310/13 |
| 59-122359 | 7/1984 | Japan | 310/12 |
| 61-258661 | 11/1986 | Japan | 310/12 |
| 2079068 | 1/1982 | United Kingdom | 310/13 |

Primary Examiner—R. Skudy
Assistant Examiner—Matthew Nguyen
Attorney, Agent, or Firm—Antonelli, Terry, Stout & Kraus

[57] ABSTRACT

A linear motor comprises a stator 1 and an armature 2 provided, respectively, with a set of spaced apart permanent magnets and a set of drive coils (not shown). The permanent magnets produce a radial magnetic field whose strength varies periodically along the length of the stator 1. The field strength is to derive speed and position signals by means of detectors constituted by field coils 4 (FIG. 1) and Hall Effect sensors 10 (FIG. 5). The periodic variation of the field strength is compensated for in the case of the field coils 4 by staggering their phases along the length of the armature and selectively combining their outputs; in the case of the Hall Effect sensors, the periodical variation is used to derive positional information.

9 Claims, 4 Drawing Sheets

LINEAR MOTORS

The following invention relates to closed loop servo control techniques and control circuitry therefor for a linear motor as described in my granted patent GB-B-207906.8, the disclosure of which is incorporated herein by reference.

Linear motors generally comprise a stationary linear member (the stator) extending over the length to be travelled, and a moving member (the armature) for exerting force against the stationary member in the direction of movement along it. The moving member carries, or is coupled, to the payload to be moved by it. The linear motor incorporated by way of reference in this specification comprises an armature and a stator movable relative to one another along a lengthwise axis of the motor and each having a plurality of magnetic flux generators, which are each coaxial with said axis, each of the plurality flux generators providing a respective sequence of north and south poles along the length of said axis, the generators of one sequence being mutually axially spaced to provide gaps therebetween and the generators of the other sequence comprising at least two independently energisable coils as the flux generators thereof and means to enable the energisation of said coils, the pole pitches of the stator and the armature being different from one another so that, when one such coil overlies a flux generator of the first sequence, another, independently energisable, coil of the second sequence overlies the gap between an adjacent flux pair of generators of the first sequence and vice versa whereby with appropriate energisation of said coils by said means the difference in pole pitch of the armature and stator can result, in use, in a net thrust of the armature relative to the stator in a desired direction at any location within said range of relative movement.

Preferably one of the sequences is relatively long and spanning the range of desired relative axial movement of the armature and stator and the other is relatively short.

In general, to effect servo control of such a motor, it has previously been necessary to employ a form of feedback transducer, external to the linear motor, to provide positional information. Additionally, a velocity transducer may also be employed to provide velocity information, where such information cannot be adequately provided by the position transducer against a given timebase. A typical example of transducers used for these purposes comprises the combination of a travelling reading head passing a stationary linear "optical grating" extending over the length to be travelled. Such devices tend however to be vulnerable and can be difficult to accommodate within many potential applications for the linear motor, especially in confined spaces or hostile environments.

According to a first aspect of the present invention, apparatus for providing velocity servo information on the movement of a linear motor of this invention comprises a plurality of field coils moving with the armature of the motor and disposed in the direction of travel for providing emfs to control circuitry regulating the velocity of the linear motor, the disposition of the coils being such that at least one such coil is capable of generating an emf substantially proportional to the velocity of the motor, regardless of the output of its neighbour(s).

In particular, a number (two or more) of the field coils can be positioned lengthwise of the direction of travel of the armature and stator such that the waveforms which they produce are phase shifted relative to one another. The shapes of the waveforms will in general be similar to one another since the pattern and density of flux lines cut by each coil at a given relative position of armature and stator will be the same. Consideration of the shapes of the waveforms (which will vary depending upon the pole configuration of the flux generators producing them) enables a velocity-representing signal to be derived from selected parts of the waveforms (or of combinations of them) which has a good degree of linearity (of velocity signal versus armature position). The appropriate points to switch between field coil waveforms (or combinations of them) can be determined empirically and the switching points can be established by monitoring the amplitudes and rates of change (including sign) of the signals.

In the first aspect of the invention, the field coils may comprise search coils surrounding the stator of the motor in such manner that as they pass through radial magnetic fields provided by the stator, emfs are generated directly within the coils. Alternatively, the search coils may be provided in the form of simple coils wound on for example a ferrous former, and located to be moved alongside the stator in such manner that the radial fields emanated therefrom generate emfs within the coils. In either case, the length of the coils used, and the disposition of their actual windings, can be optimised to achieve an induced emf characteristic which is as linear as possible over their operative region, within the magnetic fields, provided by the stator.

According to a second aspect of the present invention, apparatus for providing primarily positional information on the movement of a linear motor of this invention comprises a plurality of magnetic field strength detectors disposed in the direction of travel, their disposition being such that in combination, both directional and positional information can be obtained from the detectors and at least one of the detectors is always capable of providing positional information, regardless of the output of its neighbour(s).

In the second aspect of the invention, the field detectors utilised may be the well known form of magnetic field detector known as the "Hall Effect" detector. These detectors, in conjunction with suitable circuitry, can provide voltages substantially proportional to field strength. Examination by control circuitry and software of the voltages provided by the detectors thereby provides directly positional information. Note, if compared against a time base, velocity information can also be derived, the resolution being dependent on the sampling rate.

As with the field coils of the first aspect of the invention, if the detectors differ only in their positions lengthwise of the direction of relative movement of the armature and stator, their output waveforms will be similar in amplitude and shape, but will be phase-shifted relative to one another in the cyclically repeating flux pattern which the drive coils experience.

In a first embodiment of this second aspect of the invention, parts of the respective detector output waveforms (or of algebraic combinations of them) can be selected, by use of suitable monitoring circuitry, to derive a digitisable ramp which cyclically repeats during relative movement of the armature and stator. The current value of this ramp may actually be a count held in a counter or a variable in a software procedure or function. The digitised ramp value indicates uniquely where in the current ramp cycle the relative position of the armature and stator falls. This does not, of course, in itself uniquely identify the relative armature/stator position, because the same ramp value will be obtained at the equivalent relative positions in other ramp cycles. However, by initialising the motor (by driving it to a known reference position) at the start of operation, the subsequent ramp cycles can be counted (as the relative armature/stator position traverses them) so that both the current ramp cycle (which corresponds to a "coarse" position value), and the position within the cycle (the "fine" position) can be determined and hence the relative position can be uniquely identified.

The fact that the waveform used is a ramp also provides a means by which the direction of change of the relative position can be determined, by comparison of successive sample values. Within a single ramp cycle, of course, there is no ambiguity since an increase in the sample value (as compared with the immediately previous one) corresponds with a change in position in the direction "up" the ramp; likewise a decrease corresponds to a change in the direction "down" the ramp. The nature of a ramp, namely that successive points on it increase linearity from one linearity value until another linearity value, provides a means of identifying the direction of travel at a transition between one ramp cycle and an adjacent one. This derives simply from the fact that a ramp is not left/right symmetrical. Thus, at a transition between ramp cycles, if the new value is less than the preceding one, this signifies movement in one direction, whereas if the new value is greater than the previous one, this signifies movement in the other direction. It is important to note that it is not essential to this aspect of the invention that the outputs of the detectors (or a combination of them) is, in itself, linear, provided that it can be mapped into a linear sequence of position values within each ramp cycle (e.g., by means of a look-up table to correct for non-linearities).

In a second embodiment of this second aspect of the invention, rather than combining the detector waveforms to achieve a cyclically repeating ramp, the waveforms themselves can be analysed directly to derive positional and directional information. In this case, the waveforms are each digitised directly for comparison against a range of predetermined digital preferred values. When a digitised waveform reaches one of these values, a count signal is generated. However, the physical disposition of the detectors is so arranged, and the preferred values so chosen that no waveform can generate a count signal at the same time as count signals generated by at least one of the other waveforms. By this means, a succession of count signals are generated by the waveforms, to be added to or subtracted from a counter or variable in a software procedure or function. On account of the fact that successive count signals are derived from alternate waveforms, the direction of movement of the armature can be ascertained, to effect addition/subtraction from the counter as necessary.

In both aspects of the invention, the processing of the field coil or detector outputs can be performed by hardware or in software, after digitising the outputs.

The invention will now be described by way of reference to the accompanying diagrams in which.

Figure 1A:
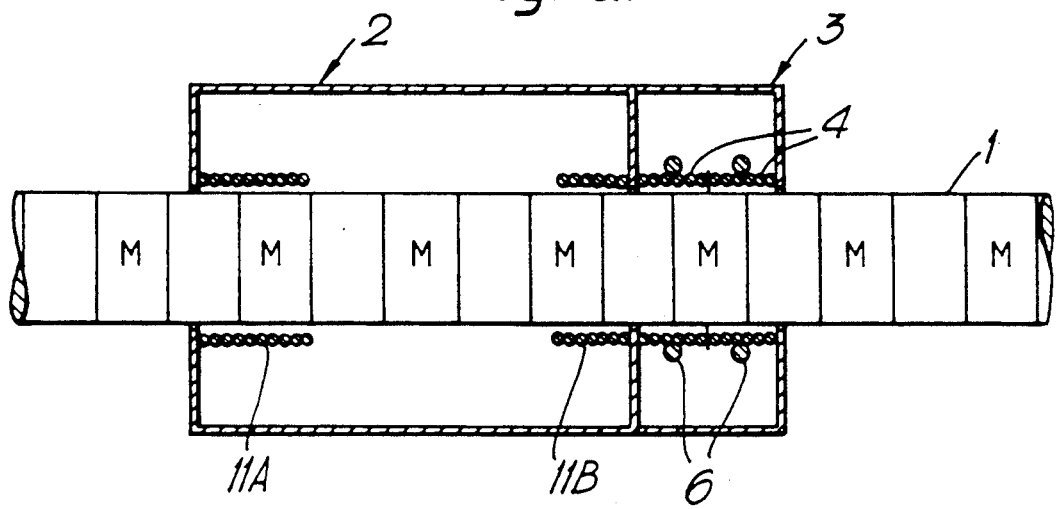
FIG. 1a shows a first version of linear motor with detector field coils disposed on the armature.
Figure 2A:
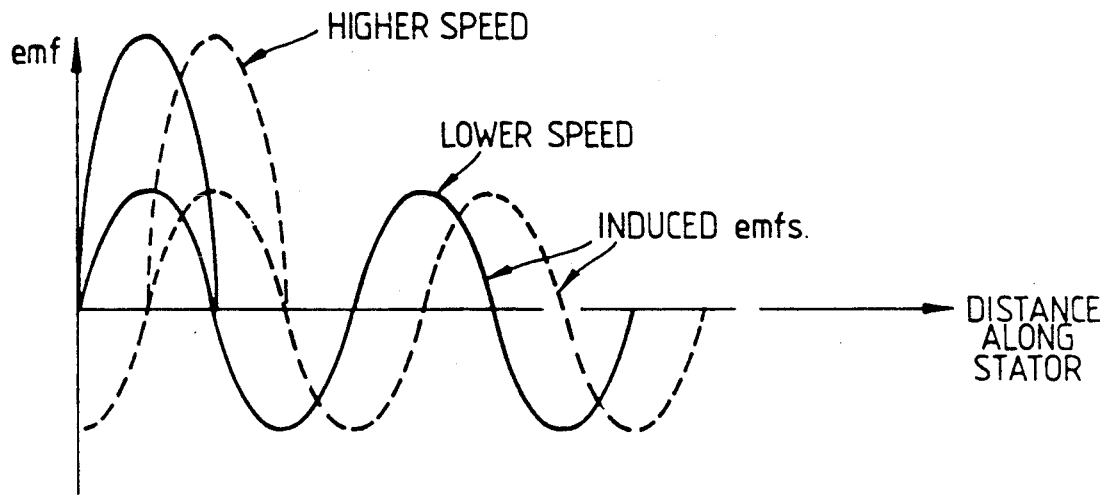
FIGS. 2a and 2b show waveforms generated by the field coils.
Figure 2B:
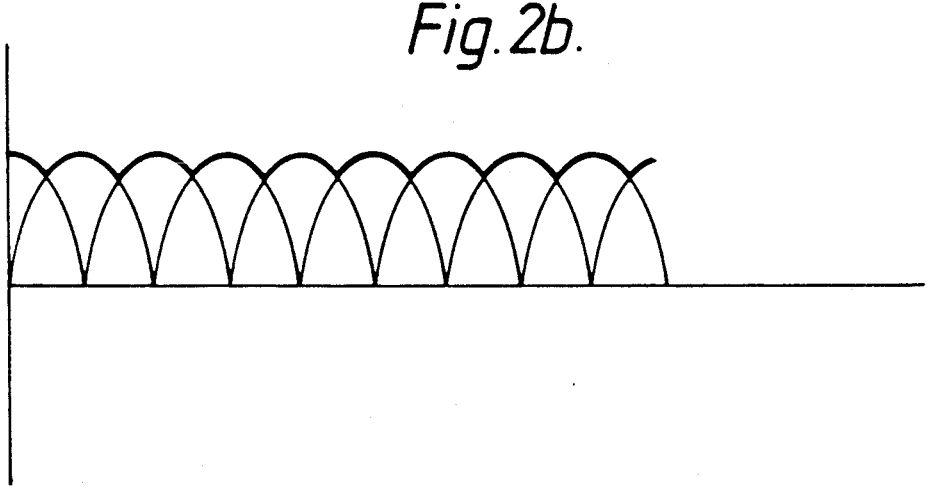

Referring to FIG. 1, a linear motor of the invention comprises a stator 1 extending over the length to be travelled, incorporating permanent magnets for providing radial fields. An armature, 2, houses drive coils 11A, 11B for providing magnetic fields to interact with the radial fields provided of the stator, so producing thrust in the direction of travel. Extending from the armature housing 1 is a servo component detection pod 3. Incorporated within the pod are detector field coils 4 surrounding the stator; unlike the coils 11A, 11B, the coils 4 are not energised, but instead are used to produce velocity-indicating emfs, as follows:

As the armature travels along the stator, currents are generated within the field coils by the radial magnetic fields emanating from the stator. The pattern of these fields is shown in FIG. 2a. (The faster the travel, the greater the induced emf.) It will be noted however that at various points, the emf provided by any one coil crosses zero and cannot therefore be used to provide velocity information. However, the coils are so disposed relative to one another that when one coil crosses zero, the other is producing emf at its maxima. By suitable processing of the waveforms a continuous profile can be obtained as shown by the dark outline in FIG. 2b. The mean of the profile indicates the speed of the armature and can thus be used by servo circuitry to control the same.

Figure 1B:
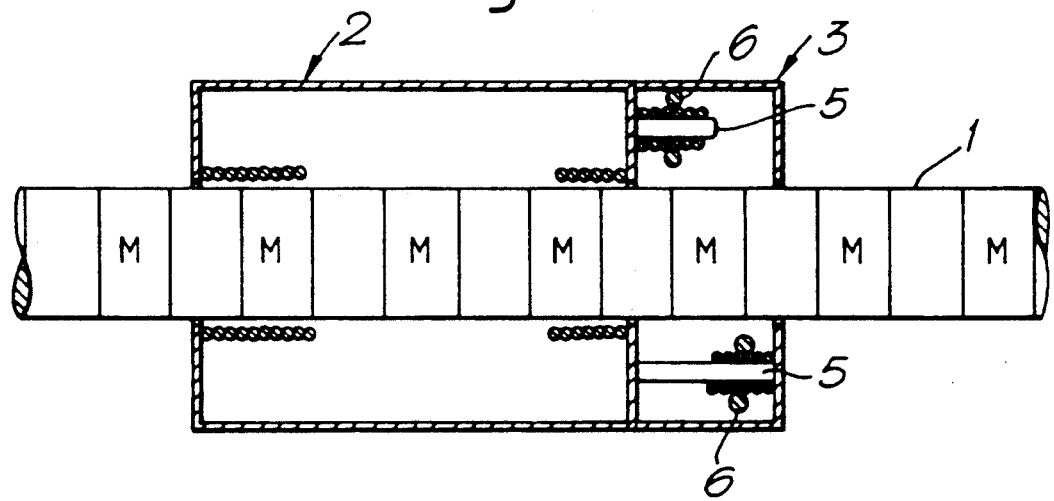
FIG. 1b shows a second version of linear motor with detector field coils disposed on the armature.

An alternative form of search coil is shown in FIG. 1b. These are shown at 5 within the pod 3, and comprise coils wound on a ferromagnetic former. In this case, emfs are generated as the radial fields cut the coils on the side of the coils nearest the stator, producing substantially the same effect the field coils show at 4.

Figure 3:
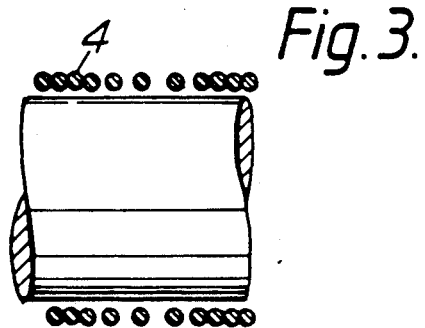
FIG. 3 shows in detail, winding arrangements of the field coils.

In practice, it is desirable to obtain a flat velocity profile. The approximately sinusoidal waveforms of FIG. 2b can result in "ripple" around the mean. To overcome this, the actual number of turns per unit length along the field coils is so varied (see FIG. 3) as to obtain as near a flat profile as possible in the operative region, resulting in the profile shown in c, and therefore a virtually linear velocity signal. Note, more than two coils can be employed to optimise this process. An important aspect of the invention concerns mutual inductive coupling interference from the main coils of the actual armature. "Switching spikes" and other noise may interfere with the low-signal "velocity emfs" being induced in the field coils. To overcome this, a secondary field coil (shown at 6) is wound around the field coils, but is connected to the main field coil circuitry. The connection and direction of winding is such as to induce a current to exactly counteract that produced by the parasitic mutual inductance coupling from the main coils, thereby leaving a substantially unaffected emf.

Figure 4:
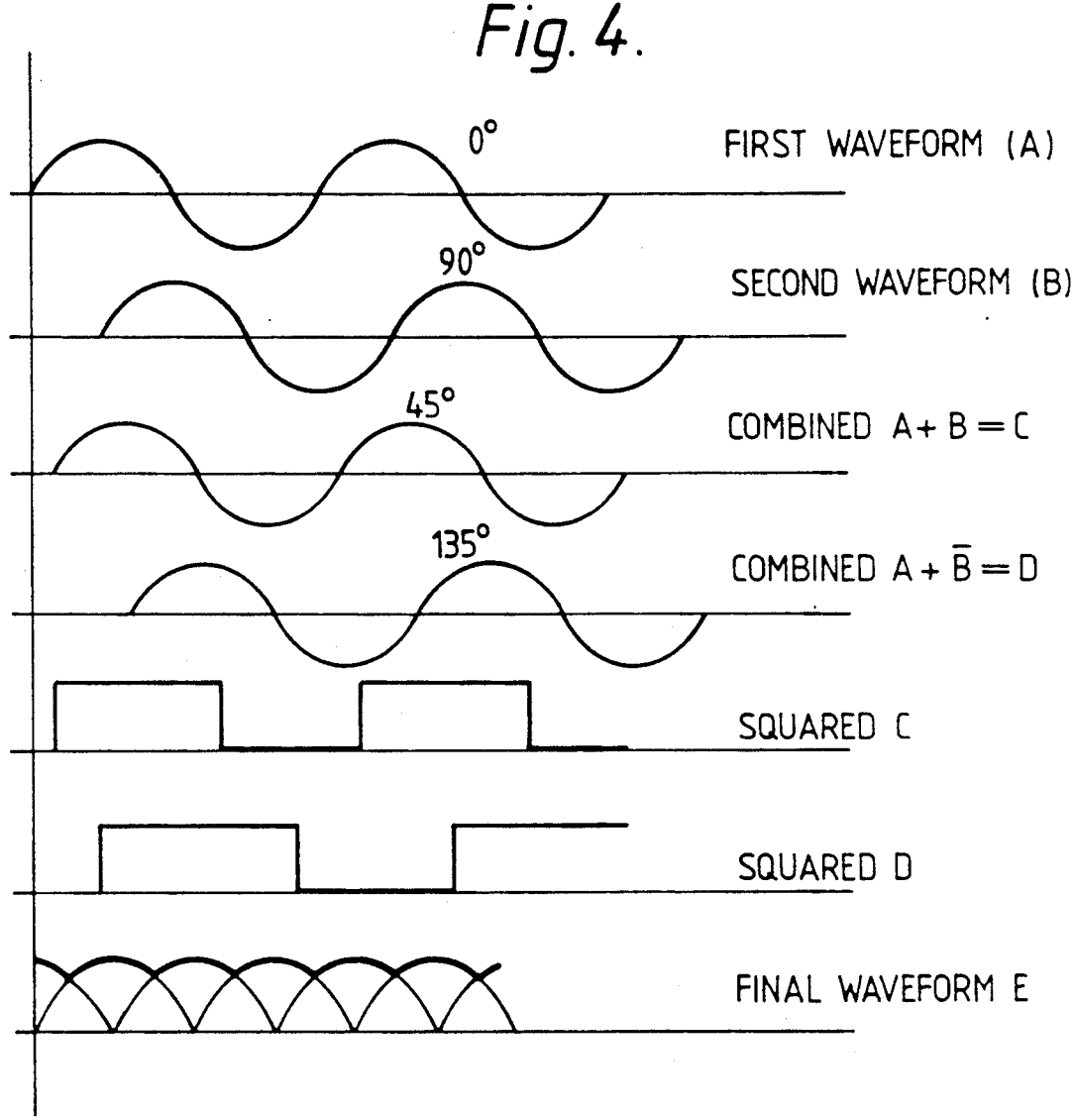
FIG. 4 illustrates switching circuitry for obtaining a consistent velocity signal from the combination of field coils.
Figure 4:
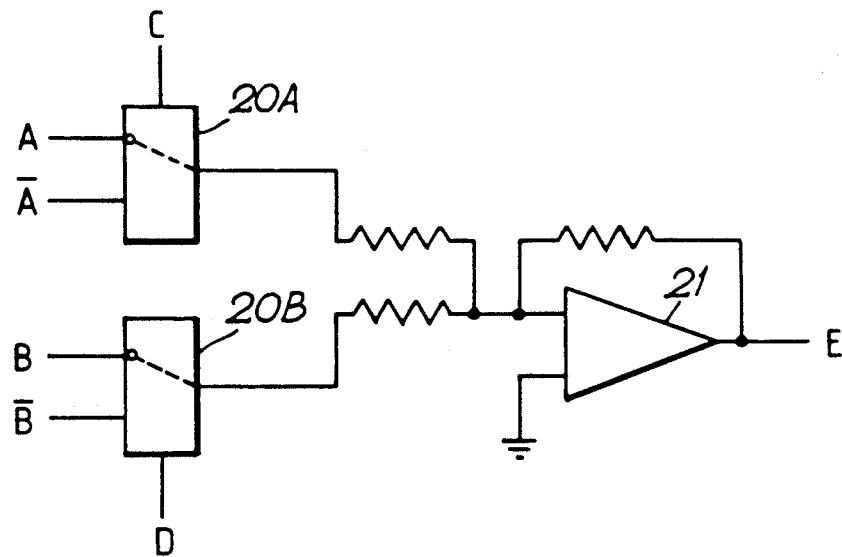

FIG. 4 illustrates the waveforms A, B produced by two sensing coils 4 phase shifted 90° relative to one another and, in its lower part, circuitry for selectively combining them to produce the final, velocity-representing signal E. The waveform C is derived by summing A and B, while waveform D is derived by reversing the polarity of B and summing the result with A. These waveforms can thus be derived with simple, well known operational amplifier circuits. The resulting waveforms are then squared by squaring circuits to derived the control input signals to two electronic change over switches 20A, 20B, which receive at their respective pairs of inputs the signal A and a signal $\overline{A}$ which is A reversed in polarity and signals B and $\overline{B}$ similarly. The outputs of the switches 20A, B are added by means of op-amp 21.

Figure 5:
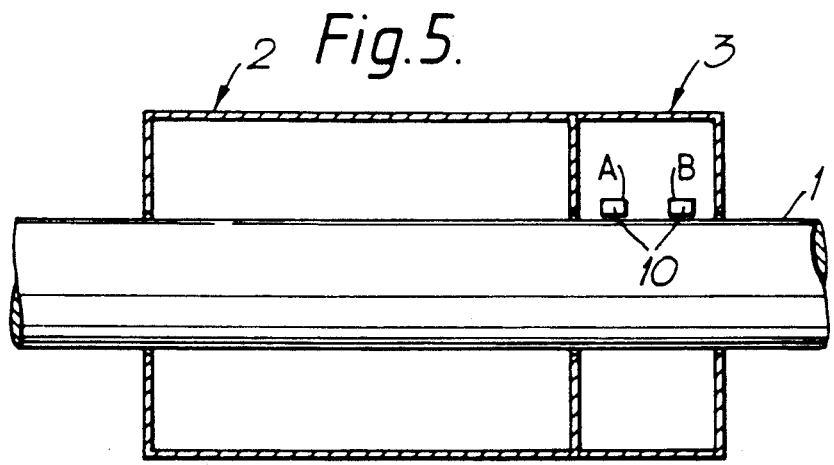
FIG. 5 shows the disposition of Hall Effect detectors for obtaining positional information.
Figure 6A:
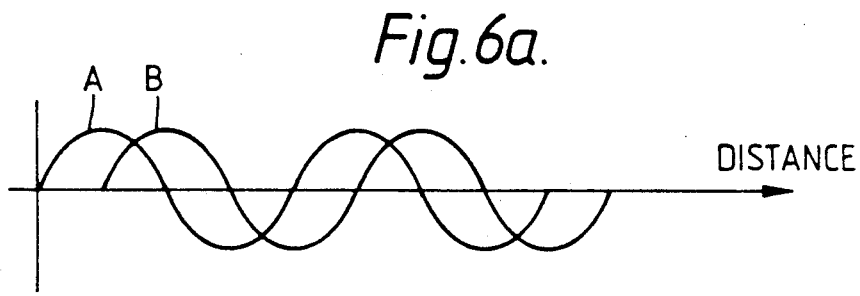
FIGS. 6a to 6c show waveforms provided by the Hall Effect detectors, and successive waveforms obtained therefrom for providing positional information.
Figure 6B:
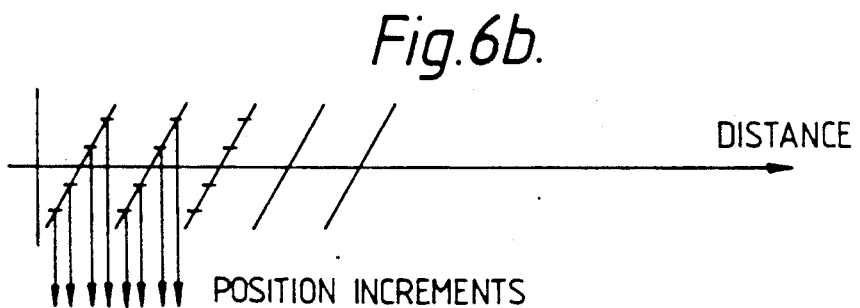

Referring now to FIG. 5, which relates to the second aspect of the invention, two magnetic field detectors are shown at 10. These detectors which may be of the "Hall" effect type, produce in combination with suitable circuitry, voltage waveforms as shown in FIG. 6(a), proportional to the field strength. By suitable electronic adding and switching of these waveforms, shown schematically in FIG. 6a, a series of near straight line waveforms may be achieved, as shown in FIG. 6b. These waveforms repeat sequentially at the same know pitch of the fields emanating from the stator of the motor. By feeding the voltages to an analogue to digital converter, a series of digital values can be obtained which so indicates the physical position of the armature relative to the stator. It will be noted that the values increase travelling from left to right up each waveform. From this "direction" information can be obtained. Additive counting of the values therefore provides, from left to right, a count representing the absolute position of the motor. From right to left, the values can be seen to decrease. Subtractive counting is then used to decrement the count accordingly. A positional count is thereby achieved for servo control of the motor.

Figure 6C:
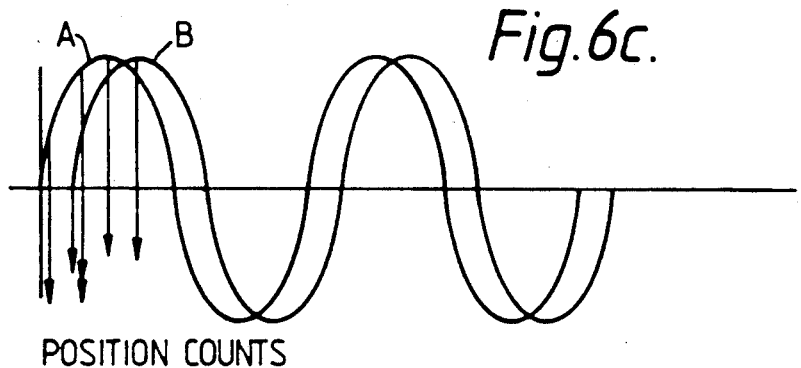

Referring to FIG. 6c, in an alternative method of obtaining count information, the waveforms themselves are digitised to provide a number of count signals. The digitised values are so chosen to ensure no count signal from one waveform can arrive at the same time as that generated by its neighbour. The signals are accumulated in a count register, addition or subtraction being determined by a network examining the sequence of arrival of the count signals and therefore the direction of travel of the armature.

Numerous variations of the above within the scopes of the first and second aspects of the invention will be apparent.

I claim:

1. A linear motor comprising:
    first and second members movable relative to one another, at an arbitrary relative speed, at least within a predetermined range, the first and second members having respective sets of magnetic flux generators for producing magnetic fields which interact to produce thrust causing a relative movement of the first and second members, the flux generators of the second member being coils;
    a field-sensing coil arrangement movable with the second member for providing an emf substantially proportional to the relative speed of the first and second members to control circuitry for regulating the relative speed of the first and second members by control of energization of said coils, the field sensing coil arrangement comprising a plurality of coils, electrically separate from the flux generating coils of the second member for sensing the magnetic fields produced by the flux generators of the first member to produce said thrust, the coils being distributed along a length of the second member such that in any arbitrary position of the two members within said range of relative movement at least one such field-sensing coil is capable of producing an emf substantially proportional to the relative speed of the first and second members, regardless of an output of the other field sensing coil or coils, the magnetic field generated by the flux generators of the first member as sensed by a field coil having a magnetic field strength which varies periodically with displacement along said second member and two or more of the field-sensing coils being positioned lengthwise of a direction of said relative movement of the first and second members such that the magnetic field strengths to which the two or more of the field-sensing coils are subjected and thus the emfs which the two or more of the field sensing coils produce are phase shifted relative to one another and at any arbitrary relative position the emf of at least one of the field-sensing coils is within a prescribed ranged of an emf magnitude; and
    a commutator circuit associated with the field-sensing coils for selectively combining said emf such that at any arbitrary relative position of the first and second members, a resulting signal varies substantially linearly with relative speed and is substantially independent of the relative positions of the first and second members.

2. A linear motor comprising:
    first and second members movable relative to one another at least within a predetermined range, the first and second members having respective sets of magnetic flux generators, the flux generators of the second member being coils;
    a plurality of magnetic field strength detectors movable with the second member, positioning of the magnetic field strength detectors being such that in any arbitrary position of the two members within a range of relative movement, both directional and positional information can be obtained formed the detectors and at least one of the magnetic field strength detectors is always capable of providing directional and positional information, regardless of the output of the remaining detector or magnetic field strength detectors; and
    a monitoring circuit and a counter and wherein parts of the respective magnetic field strength detector outputs may be selected to derive a digitizable ramp which cyclically repeats during said relative movement so that the ramp value indicates uniquely the relative position of the first and second member within one ramp cycle and wherein at a start of operation the motor may be driven to a known relative position such that upon said relative movement, subsequent ramp cycles may be counted by said counter to give a coarse position value.

3. A linear motor according to claim 2 wherein two or more of the magnetic field strength detectors are positioned lengthwise of the direction of said relative movement of the first and second members such that the emfs which they produce are phase shifted relative to one another.

4. A linear motor according to claim 2 wherein said magnetic field strength detectors are "Hall Effect" detectors.

5. A linear motor according to claim 2 further comprising means to compare successive values of said ramp whereby the direction of said relative movement is indicated by the result of said comparison.

6. A linear motor comprising:

first and second members movable relative to one another, at an arbitrary relative speed, at least within a predetermined range, the first and second members having respective sets of magnetic flux generators, the flux generators of the second member being coils;

a plurality of magnetic field strength detectors movable with the second member, positioning of the magnetic field strength detectors being such that in any arbitrary position of the two members within a range of relative movement, both direction and positional information can be obtained formed the detectors and at least one of the magnetic field strength detectors is always capable of providing directional and position information of the first and second members, regardless of the output of the remaining magnetic field strength detector or detectors; and a circuit wherein said respective magnetic field strength detector outputs are digitized such that when one of said outputs reaches a predetermined value a count signal is generated, the digitizing and the positioning of the magnetic field strength detectors being such that no count signal from one magnetic field strength detector can be generated simultaneously with a count signal of the remaining magnetic field strength detector or detectors.

7. A linear motor comprising:

first and second members movable relative to one another, at an arbitrary relative speed, at least within a predetermined range, the first and second members having respective sets of magnetic flux generators for producing magnetic fields which interact to produce thrust causing a relative movement of the first and second members, the flux generators of the second member being coils; and a field-sensing coil arrangement movable with the second member for providing an emf substantially proportional to the relative speed of the first and second members to control circuitry for regulating the relative speed of the first and second members by control of energization of said coils, the field sensing coil arrangement comprising a plurality of coils, electrically separate from the coils of the flux generators of the second member, for sensing the magnetic fields produced by the flux generators of the first member to produce said thrust, the coils being distributed along a length of the second member such that in any arbitrary position of the two members within said range of relative movement at least one such field-sensing coil is capable of producing an emf substantially proportional to the relative speed of the first and second members, regardless of an output of the other field sensing coil or coils.

8. A linear motor according to claim 7 wherein the field-sensing coils surround the second member in such a manner that as the field sensing coils pass through radial magnetic fields provided by the first member emfs are generated directly within the field coils.

9. A linear motor according to claim 7 further comprising a secondary coil, connected to one of said field coils, and which is wound around the field-sensing coil in such a turning direction as to induce a current to compensate for that produced by any parasitic mutual inductance coupling from the magnetic flux generators of the second member.

* * * * *